(12) United States Patent
Kirschbaum et al.

(10) Patent No.: US 12,380,242 B2
(45) Date of Patent: Aug. 5, 2025

(54) TERMINAL, DEVICE FOR CUSTOMISING SERVICE REQUESTS AND METHODS ENABLING A CUSTOMISED SERVICE

(71) Applicant: Orange, Issy-les-Moulineaux (FR)

(72) Inventors: Patrick Kirschbaum, Châtillon (FR); Sylvie Gaspar, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 344 days.

(21) Appl. No.: 17/763,610

(22) PCT Filed: Sep. 30, 2020

(86) PCT No.: PCT/FR2020/051708
§ 371 (c)(1),
(2) Date: Mar. 24, 2022

(87) PCT Pub. No.: WO2021/064323
PCT Pub. Date: Apr. 8, 2021

(65) Prior Publication Data
US 2022/0343023 A1 Oct. 27, 2022

(30) Foreign Application Priority Data
Sep. 30, 2019 (FR) ...................................... 1910836

(51) Int. Cl.
*G06F 21/62* (2013.01)
(52) U.S. Cl.
CPC ................ *G06F 21/6254* (2013.01)
(58) Field of Classification Search
CPC ............. G06F 21/6254; G06F 21/6263; H04L 63/0884

USPC ........................................................ 726/26
See application file for complete search history.

(56) References Cited

U.S. PATENT DOCUMENTS

| | | | |
|---|---|---|---|
| 2013/0126601 A1* | 5/2013 | Lee ........................ | G06F 16/23 235/375 |
| 2014/0141720 A1* | 5/2014 | Princen ............... | H04L 63/0407 455/41.2 |
| 2014/0173695 A1 | 6/2014 | Valdivia | |
| 2015/0193872 A1* | 7/2015 | Ivanoff .................. | G16H 50/20 705/38 |
| 2016/0155192 A1* | 6/2016 | Cochran ................ | G06Q 40/03 705/38 |

(Continued)

FOREIGN PATENT DOCUMENTS

| | | |
|---|---|---|
| GB | 2549786 A | 11/2017 |
| GB | 2549791 A | 11/2017 |

OTHER PUBLICATIONS

International Search Report and Written Opinion dated Jan. 19, 2021 for Application No. PCT/FR2020/051708.

*Primary Examiner* — Lan Dai T Truong
(74) *Attorney, Agent, or Firm* — Knobbe, Martens, Olson & Bear, LLP

(57) ABSTRACT

The terminal implements a method for requesting a personalized service by a communication terminal, said method comprising, following an unlocking of access to a personalized service request device, said device being implemented in the communications terminal:
an acquisition of an anonymous unique identifier, adapted to be transmitted by said terminal, in association with a service query, to a service query personalization device, the service query being intended for the service provision device.

13 Claims, 3 Drawing Sheets

(56) References Cited

U.S. PATENT DOCUMENTS

| | | | |
|---|---|---|---|
| 2017/0006453 A1* | 1/2017 | Liu | H04W 8/005 |
| 2018/0173891 A1* | 6/2018 | Wang | G06F 21/6245 |
| 2019/0334884 A1* | 10/2019 | Ross | G06F 21/41 |
| 2020/0125218 A1* | 4/2020 | Bender | H04L 51/04 |
| 2021/0037604 A1* | 2/2021 | Malthankar | H04W 76/12 |
| 2023/0088498 A1* | 3/2023 | Belov | H04W 12/06 |
| | | | 726/4 |
| 2023/0394233 A1* | 12/2023 | Lequeux | G06F 16/90 |

\* cited by examiner

TERMINAL, DEVICE FOR CUSTOMISING SERVICE REQUESTS AND METHODS ENABLING A CUSTOMISED SERVICE

RELATED APPLICATIONS

This application is the U.S. National Phase of Application No. PCT/FR2020/051708 entitled "TERMINAL, DEVICE FOR CUSTOMISING SERVICE REQUESTS AND METHODS ENABLING A CUSTOMISED SERVICE" and filed Sep. 30, 2020, which claims the benefit of French Patent Application No. 1910836, filed Sep. 30, 2019, each of which is incorporated by reference in its entirety.

FIELD

The invention relates to the general field of telecommunications. It relates more particularly to the provision of a service.

BACKGROUND OF THE INVENTION

In accordance with the state of the art, some websites or software applications use an anonymous unique identifier for each user in order to provide him with a personalized service. For example, a merchants website can provide a user with a content based on a purchase history of that user, or based on a history of web pages viewed by that user.

According to the state of the art, a user can be identified by personal contact information, such as his email address or his telephone number, generally associated with a password. Alternatively, the user can be identified by one of his user accounts on the social networks, for example his Facebook or LinkedIn account (registered trademarks).

These methods of the prior art are unsatisfactory because they require the user to provide some personal information in order to receive a service. This is inconsistent with the personal information protection regulations, such as the General Data Protection Regulation GDPR 2018 in Europe.

Therefore, there is a need for a solution that does not have the disadvantages of the methods known from the state of the art to allow a user to access a personalized service without disclosing his personal information, in other words anonymously.

SUMMARY OF THE INVENTION

The invention relates to a method for requesting a personalized service by a communication terminal, said method comprising, following an unlocking of access to a personalized service request device, this device being implemented in the communication terminal:
  an acquisition of an anonymous unique identifier, adapted to be transmitted by the terminal, in association with a service query, to a service query personalization device, the service query being intended for the service provision device.

Correlatively, the invention relates to a communication terminal configured to request a personalized service and comprising:
  an identification obtainer configured to acquire, following an unlocking of access to a personalized service request device implemented in the terminal, an anonymous unique identifier, adapted to be transmitted, by said terminal, in association with a service query, to a service query personalization device, the service query being intended for the service provision device.

The terminal, in accordance with the invention, implements the personalized service request method according to the invention.

The characteristics and advantages of the personalized service request method according to the invention presented below apply in the same way to a terminal in accordance with the invention, and vice versa.

In accordance with the invention, the terminal can be a telephone of the Smartphone type, a tablet, a connected watch, or any other communicating device, in particular equipped with a fingerprint reader.

Within the meaning of the invention, the anonymous unique identifier allows identifying an account with the service query personalization device. The terminal inserts the identifier in its queries so that the personalization device recognizes that these queries correspond to the same account.

In other words, the anonymous unique identifier allows identifying all the queries originating from the terminal without disclosing, neither to the service provision device(s), or to the personalization device, any information neither on the terminal itself (MAC address, brand, model), nor on the user of the terminal (name, email address, telephone number).

The invention allows the user of the terminal to receive a response to the service query via an account associated with the anonymous unique identifier, without having provided personal information such as his email address, his telephone number or an account on a social network.

The anonymous unique identifier according to the invention is an anonymous identifier, which does not allow identifying the user of the terminal. The anonymous unique identifier according to the invention is associated with an account on the personalization device, for the terminal.

The anonymous unique identifier can constitute a unique application code, for a software application installed on the terminal, this application comprising instructions for the execution of the steps of a personalized service request method according to the invention.

In one embodiment, the anonymous unique identifier is acquired using a random generation function. In practice, this random generation function is configured not to generate identical identifiers and statistically ensure that all generated identifiers are unique.

In one embodiment, the terminal generates the anonymous unique identifier itself, for example by executing a random generation function.

Particularly, the acquisition of the anonymous unique identifier by the terminal includes:
  a sending to the personalization device of a request for an anonymous unique identifier; and
  a reception of the anonymous unique identifier originating from the personalization device.

In another embodiment, the personalization device can generate the anonymous unique identifier using a random generation function.

In one embodiment, the personalized service request method includes:
  a sending of a service query associated with the anonymous unique identifier to the service provision device; and
  following this sending, a reception of a personalized response originating from the service provision device, the personalized response resulting from a processing implemented by the service provision device based on a modified query received from the service query personalization device, the modified query having been generated by the service query personalization device from the service query sent and the anonymous unique identifier associated.

In one embodiment, the personalized service request method further includes a step of capturing a code relating to the service, the service query sent by the terminal is constituted either by an initial service query based on the captured code or a first service query acquired based on the initial service query. In this mode, the terminal further includes a code sensor, for example, this sensor comprising a camera, a radio receiver such as NFC, Zigbee or being able to scan a code, etc.

Particularly, the terminal generates a first service query based on:
- the initial service query acquired based on the captured code, and
- the anonymous unique identifier of the terminal for the personalization device.

The invention therefore allows the user of the terminal to easily and anonymously receive a personalized service. The user only needs to photograph the code by using his terminal. The terminal, implementing the method of the invention, generates the first query comprising the anonymous unique identifier and the initial service query resulting from the captured code and sends this first query to the personalization device to access the service.

Particularly, the code can be a code of the "QR code" type or of the "NFC tag" type.

A program installed on the terminal to implement the personalized service request method in accordance with the invention and the code can both be managed by the same administrative entity, for example the same company developing a product purchase software application and proposing codes pasted on products sold by this company.

Two terminals scanning the same code can access two different services. Indeed, as the two terminals have different unique identifiers, the contents of the queries sent to the personalization device are different. According to one use of the invention, when the code identifies a product marketed in a store, the prices can be different for the same product, for example if one of the unique identifiers corresponds to an account that benefits from a reduction.

In one embodiment of the invention, the acquisition of an identifier is implemented upon reception by the personalized service request device of a notification from the terminal following a successful unlocking of the personalized service request device.

In one embodiment of the invention, the acquisition of an identifier is implemented upon reception by the personalized service request device of a notification from the terminal following a first successful unlocking of the personalized service request device.

These two modes allow verifying that the personalized service request device is used by the owner or the regular user of the terminal, since he has succeeded in unlocking it, for example by using a PIN code or a fingerprint of the user. Therefore they allow, when the unlocking of the personalized service request device is supported by the terminal, the unlocking authorization notification transmitted by the terminal, in particular a system device of the terminal, to the personalized service request device, used to trigger the acquisition of the anonymous unique identifier.

In addition, these modes allow ensuring that the anonymous unique identifier is acquired within the framework of a lawful use of the personalized service request device. The identifier acquired is recorded in a memory of the terminal and will be included in the queries emitted by the terminal towards the personalization device. In this way, the identifier allows identifying an account associated with the regular user of the terminal, while preserving the anonymity of the user.

The acquisition of the anonymous unique identifier being conditional on the unlocking of the personalized service request device of the terminal, if the terminal is a multi-user terminal, a separate anonymous unique identifier is associated with each user of the terminal via a separate account with the personalized service request device-personalization device pair.

The invention also relates to a method for personalizing service queries by a service query personalization device, said method comprising:
- a reception of a first service query associated with an anonymous unique identifier originating from a communication terminal, said anonymous unique identifier having been acquired following an unlocking of access to a personalized service request device implemented in the communication terminal, the first service query allowing the service query personalization device to generate a second query from said first service query, said second query being personalized based on data previously recorded by the service query personalization device in association with said anonymous unique identifier.

Correlatively, the invention relates to a service query personalization device, and comprising:
- a transmitter configured to receive a first service query associated with an anonymous unique identifier originating from a communication terminal, this anonymous unique identifier having been acquired following an unlocking of access to a personalized service request device implemented in the communication terminal, the first service query allowing the service query personalization device to generate a second query from said first service query, said second query being personalized based on data previously recorded by the service query personalization device in association with the anonymous unique identifier.

The personalization device in accordance with the invention implements the service query personalization method according to the invention. The characteristics and advantages of the personalization method according to the invention presented below apply in the same way to a personalization device in accordance with the invention, and vice versa.

The personalization device in accordance with the invention can be connected, via a telecommunications network, to several terminals, comprising terminals in accordance with the invention. In addition, the personalization device in accordance with the invention is connected to one or several service provision devices and allows requesting at least one service provided by this or these service provision device(s).

In one embodiment, the personalization device in accordance with the invention acquires the anonymous unique identifier by generating it, for example using a random generation function, following the reception of a request originating from a terminal in accordance with the invention.

In another mode, the personalization device in accordance with the invention acquires the anonymous unique identifier by receiving it from a terminal in accordance with the invention.

Particularly, when the terminal sends the anonymous unique identifier to the personalization device for the first time, it can send it alone or comprised in a service request query. In the second case, the step of acquiring the anonymous unique identifier by the personalization device is implemented following the reception of a query comprising this identifier.

The update of the database by the recording of the information about the access allows tracing the service requests by using the anonymous unique identifier. The personalization device can thus collect useful data for a customer relationship management for the services to which it provides access. Particularly, the database managed by the personalization device in accordance with the invention can be shared for several services, in particular when the personalization device is connected to different service provision devices.

In one embodiment of the invention, the service query personalization method includes a viewing of the database, the second query being acquired by modification of the first query based on a result of the viewing of the database.

In this mode, the request manager of the personalization device, in accordance with the invention, is configured to view the database and to acquire the second query by modification of the first query based on a result of the viewing of the database.

By way of example, the personalization device in accordance with the invention can enhance or modify the first query with data on a purchase history made by the same account identified by the anonymous unique identifier, and thus acquire the second modified query which will be transmitted to the service provision device. The service provision device can then provide a personalized response, for example web pages relating to products likely to interest the user associated with the anonymous unique identifier, or special discounts from a certain number of purchases without the service provision device having knowledge of this anonymous unique identifier, or even of an identity of the user or of his terminal. The user of the terminal in accordance with the invention therefore benefits from the personalized service without having given personal identifiers such as an email address or a telephone number.

According to another example, the personalization device in accordance with the invention acquires the second query by enhancing the first query with a status relating to a number of requests for the same service by using the anonymous unique identifier, for example a status among "visitor", "customer" and "premium customer". By receiving this modified query, the service provision device of this service can provide a personalized service based on the status with which the anonymous unique identifier is associated.

In one embodiment, the personalized service request method according to the invention, implemented by the terminal, further includes a step of sending to the personalization device information on the location of the terminal, such as a GPS (Global Positioning System) position. This information allows the personalization device to direct the query to a determined service provision device based on the location information. For example, if the query is related to a service offered by a site of an international merchant, the personalization device can direct the query towards a service provision device providing this service, in the country corresponding to the location of the terminal, for example "orange.fr" for a terminal in France and "orange.be" for a terminal in Belgium.

According to another example, the information on the location of the terminal can be transmitted from the personalization device in accordance with the invention to a service provision device, the service provision device providing a personalized service based on this information on the location. For example, if the query is related to a communication service on events, the service provision device can provide a communication service on the events taking place in the same geographical region where the terminal is located.

The invention also relates to a first computer program on a recording medium, this program being capable of being implemented in a computer or a terminal in accordance with the invention. This program includes instructions adapted to the implementation of a method for requesting a personalized service from a service as described above.

The invention also relates to a second computer program on a recording medium, this program being capable of being implemented in a computer or a service query personalization device in accordance with the invention. This program includes instructions adapted to the implementation of a service query personalization method, as described above.

Each of these programs can use any programming language, and be in the form of source code, object code or intermediate code between source code and object code, such as in partially compiled form, or in any other desirable form.

The invention also relates to an information medium or a recording medium readable by a computer, and comprising instructions of the first, second or third computer program as mentioned above.

The information or recording media can be any entity or device capable of storing the programs. For example, the media can include a storage medium, such as a ROM, for example a CD ROM or a microelectronic circuit ROM, or a magnetic recording medium, for example a floppy disk or a hard disk or a flash memory.

On the other hand, the information or recording media can be transmissible media such as an electrical or optical signal, which can be routed via an electrical or optical cable, by radio link, by wireless optical link or by other media.

The programs according to the invention can particularly be downloaded from an Internet-type network.

Alternatively, each information or recording medium can be an integrated circuit in which a program is incorporated, the circuit being adapted to execute or to be used in the execution of one of the methods in accordance with the invention.

BRIEF DESCRIPTION OF THE DRAWINGS

Other characteristics and advantages of the present invention will become apparent from the description given below, with reference to the appended drawings which illustrate an example of embodiment devoid of any limiting character. On the figures.

DETAILED DESCRIPTION OF EMBODIMENTS

Figure 1:
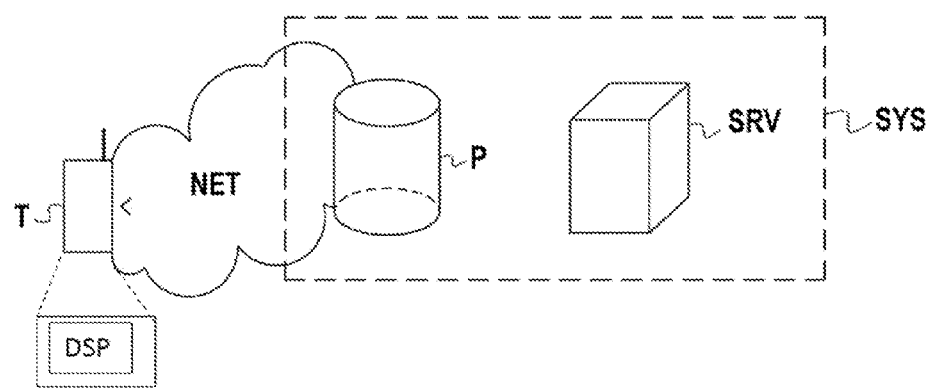
FIG. 1, an architecture of a telecommunication network in which methods of the invention are implemented according to one embodiment of the invention.

FIG. 1 illustrates an architecture of a telecommunications network NET in which the personalized service request method and the service query personalization method, in accordance with the invention, are implemented according to one embodiment of the invention. No limitation is imposed as to the nature of the network NET. The network NET can be of Internet type for example. A terminal T and a service query personalization device P, in accordance with the invention, are connected to the network NET. The service query personalization device P cooperates with one or several service provision devices SRV co-located with the personalization device P or remote. The pair formed by the service query personalization device P and a service provision device SRV during a personalized service request constitutes a system SYS.

The terminal T can be a telephone of the smartphone type, a tablet, a connected watch or any other type of communicating device. In this example, the terminal T has a sensor, the sensor comprising either a camera, or a device for scanning a code, such as a barcode or a QR code, or a transmitter, in particular an NFC receiver.

This terminal T includes a personalized service request device DSP.

The service provision device SRV may in particular consist of a server hosting at least one website or one software application providing one or several services to customers. The personalization device P constitutes, in particular, an intermediary between the service provision device SRV and its customers, such as for example the user of the terminal T.

Optionally, the personalization device P is implemented in the service provision device SRV (not illustrated). In this case, the personalization device P of the service provision device SRV provides a second service query based on the first service query received from the communication terminal T to one or several servers or to a processing device implementing a service based on the second service query.

The personalization device P and/or the service provision device SRV can be software modules implemented on physical devices having the architecture of a computer. For example, the personalization device P is a service intermediation platform in particular implemented in php language and the service provision device SRV can be implemented in html language.

Alternatively, the personalization device P and/or the service provision device SRV can be physical devices.

In this mode illustrated in FIG. 1, the personalization device P is implemented in a device separate from the device implementing the service provision device SRV. In another mode, the personalization device P is implemented in the same physical device as the service provision device SRV.

In the mode illustrated in FIG. 1, the personalization device P is dedicated for the intermediation of the services offered by the service provision device SRV. Alternatively, the personalization device P can be shared between several service provision devices, comprising the service provision device SRV, and form a device for personalizing the different services offered by these service provision devices.

Figure 2:
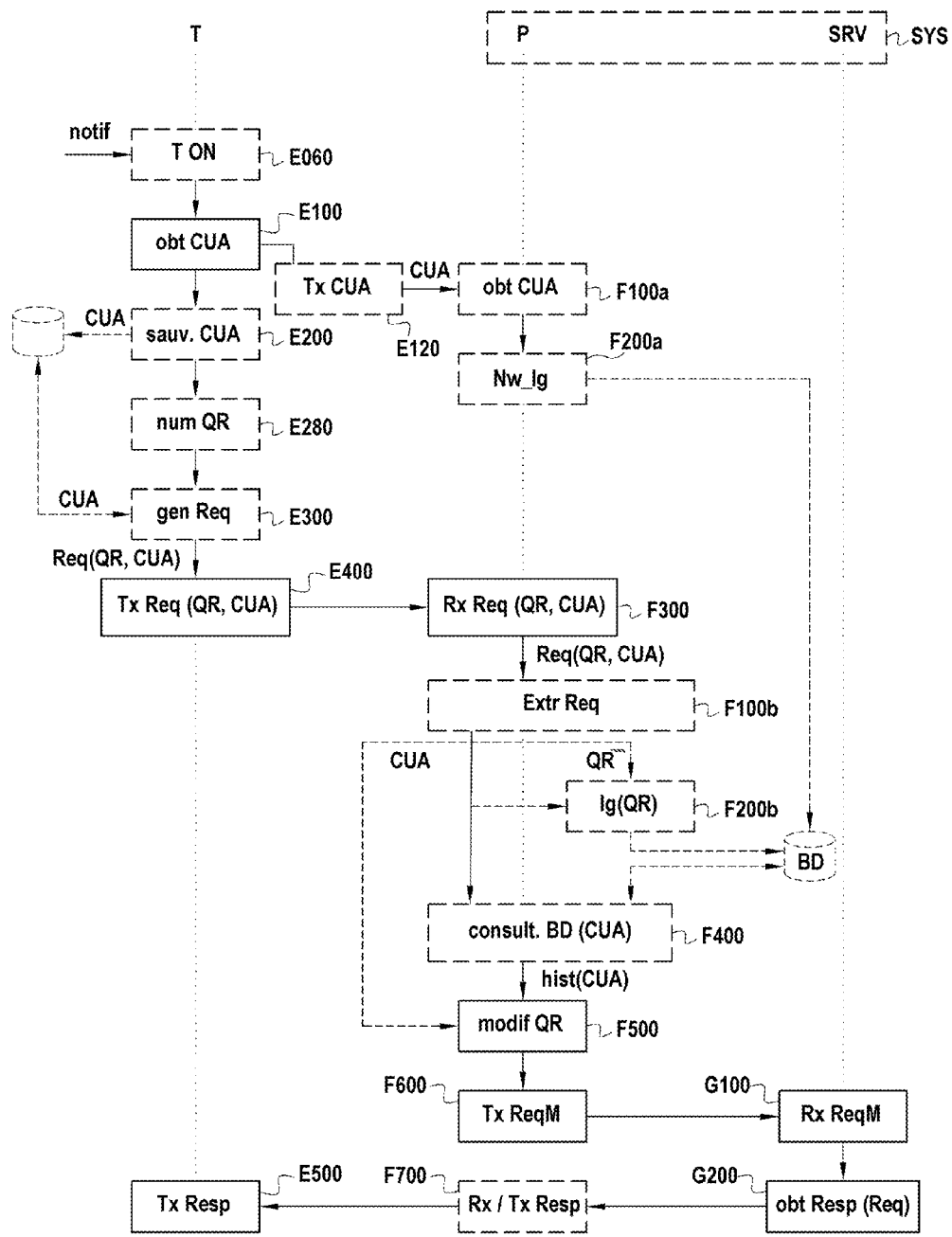
FIG. 2, a flowchart representing steps of a personalized service request method and steps of a method allowing a service query personalization, the methods being in accordance with the invention and implemented according to a first embodiment.

FIG. 2 is a flowchart representing steps of the personalized service request method, and steps of the service query personalization method according to a first embodiment of the invention, the methods being in accordance with the invention.

The personalized service request method is implemented by the terminal T, while the service query personalization method is implemented by the personalization device P. Particularly, the steps Exxx described below are steps of the personalized service request method according to the invention. The steps Fxxx described below are steps of the service query personalization method according to the invention.

Particularly, the personalized service request method in accordance with the invention is executed by a computer program PROG1 recorded in the terminal T. In the mode described here, the program PROG1 is a software application installed on the terminal T. Particularly, the application PROG1 can be downloaded from the personalization device P or from another device managed by the same administrative authority as the personalization device P.

Particularly, the terminal T is configured through its application PROG1 to acquire an address AoC_P of the personalization device P in order to be able to communicate therewith.

The access to the personalized service request device of the terminal T is unlocked by its user, for example by a PIN code or by the user's fingerprint. During a step E060, the program PROG1 receives a notification notif of a locking and unlocking device implemented in the terminal, notifying it of the successful unlocking of the personalized service request device of the terminal T.

Following the unlocking of the terminal T and during a step E100, the terminal T acquires an anonymous unique identifier CUA. This identifier allows identifying an account with the personalization device P, accessible from the application PROG1 installed on the terminal T. Thus, the anonymous unique identifier is associated not with the terminal T but with the user having acquired, by unlocking, access to the personalized service request DSP device. On a multi-user terminal, this allows each user to benefit from a personalized service and not a personalized service for the terminal.

In this first embodiment, the terminal T acquires the anonymous unique identifier CUA by executing a random generation function. The anonymous unique identifier CUA is thus generated by the terminal T. To guarantee the uniqueness of the identifier generated by the terminal, it is in particular a function either of a unique data provided by the personalization device P or of user-specific identification data. Particularly, the function applied on the user-specific identification data to generate the anonymous unique identifier does not allow a third party to find these identification data by inverse function. Thus, the anonymity of the anonymous unique identifier is secured.

In the embodiment described here, during a step E200, the terminal T records the anonymous unique identifier CUA in a memory of the terminal T. Alternatively, the anonymous unique identifier CUA is regenerated, preferably identically, at each unlocking or for each service query sent by the terminal to the service query personalization device P.

During a step E120, the terminal T sends, for example via its application PROG1, the anonymous unique identifier CUA to the personalization device P. In particular, the terminal T knows the address of the personalization device P thanks to the configuration of the application PROG1. The terminal T does not send to the personalization device P either an e-mail address, or a telephone number, or any other personal information that allows identifying the user of the terminal T. The anonymous unique identifier CUA guarantees the anonymity of the user behind the service request.

During a step F100a of the service query personalization method, the personalization device P acquires the anonymous unique identifier CUA by receiving it from the terminal T. The personalization device P creates, in association with the anonymous unique identifier CUA, in its memory, for example in a database BD, during a step F200a, a log Nw_lg to store traces of the service requests associated with this anonymous unique identifier CUA. This log can be for example in the form of a history or a log of the service requests associated with the anonymous unique identifier CUA.

Particularly, in this embodiment, the personalization device P implements a customer relationship manager or executes customer relationship management software. The personalization device P records in its memory, for example in the database BD, the unique identifiers of several accounts corresponding to accounts of users of services provided by the service provision device SRV. The identity of the users is known neither by the personalization device P nor by the service provision device SRV.

During a step E280 of the personalized service request method according to the invention, the terminal T captures a code, for example of the "QR code" type by scanning, reading, photography, etc. This code can provide a query called initial QR query to access a web page hosted by the service provision device SRV. The first query within the meaning of the invention may include this initial QR query.

Thus, particularly, during a step E300, the terminal T, and more specifically the personalized service request device of the terminal T, generates the first query Req comprising the initial QR query, this first query being associated with the anonymous unique identifier CUA read in the memory of the terminal T. In one embodiment, the first query Req includes the anonymous unique identifier CUA. In another embodiment, the first query Req is sent with the anonymous unique identifier CUA in the same data packet to the personalization device P, the first query Req indicating that the initial QR query is to be personalized. Particularly, the terminal T can, during the step E300 of generating the first query Req, either enhance the initial QR query with other information, or generate a first query Req by integrating therein the initial QR query and possibly with other information such as GPS location information of the terminal T; such information allows the personalization device P to identify the geographical position of the captured code.

Particularly, the terminal T sends the first query Req to the personalization device P during a step E400. Indeed, the personalization device P is an intermediate device between the terminal T and the service provision device SRV, allowing the terminal T to receive particularly the web page corresponding to the captured code.

Particularly, during a step F300 of the service query personalization method, the personalization device P receives the first query Req and extracts from this first query Req the anonymous unique identifier CUA and the initial QR query, in particular in the form a web page link corresponding to the captured code.

Particularly, the personalization device P records, in its memory, for example in the database BD indexed by anonymous unique identifiers, the identifier CUA. In the embodiment described here, this database BD includes information on the service histories provided by the service provision device SRV, for example the history of the services requested by the terminal T (in particular, via its personalized service request device DSP, or via its application PROG1 to the service provision device SRV). By way of example, when the service provision device SRV hosts a merchants website, the database BD can include a history of purchases made by the account of the terminal T with this website, or a history of web pages of this site viewed by the account of the terminal T. In another example, the database records the number of queries comprising the anonymous unique identifier CUA it received to connect to the service provision device SRV.

In the mode described here, the database BD is recorded in a memory of the personalization device P. Alternatively, the database BD can be recorded in a device separate from the personalization device P but accessible by the personalization device P.

Particularly, based on the acquired identifier CUA, the personalization device P views during a step F400 the database BD. The personalization device P can update, during a step F200b, the database BD based on the content of the query Req, for example by recording the content of the query Req in association with the identifier CUA, or by incrementing a counter for the number of accesses to the same service as the one designated by the query Req, or by recording the information on the GPS location of the terminal T. The personalization device P thus records, in a field of the database BD, information relating to the service provided by the service provision device SRV.

During a step F500, the personalization device P modifies the first query Req based on a result hist(CUA) of the viewing of the database BD, for example by specifying the number of viewings of the QR web page attached to the captured code, or by specifying the GPS location of the terminal T. The personalization device P then acquires a second query ReqM, from the first query Req. Thus, to acquire from the service provision device SRV a personalized service, the service provision device SRV does not need to know that the service request originates from the same user (even if he is anonymous).

Particularly, the second query ReqM does not include the anonymous unique identifier. The user's anonymity is then doubly guaranteed since not only does the service provision device not have access to the user's identity, but it also does not have access to all the service request habits of the user but only to those useful for the personalization of the service.

Particularly, during a step F600, the personalization device P sends the second query ReqM to the service provision device SRV.

The service provision device SRV receives the query ReqM during a step G100.

During a step G200, the service provision device SRV acquires data Resp based on the query ReqM and particularly based on traces related to the anonymous unique identifier, these data Resp being personalized according to the provided traces hist(CUA).

For example, the personalized data can be a web page determined based on QR information comprised in the captured code (E280) and on the GPS location of the terminal T, such as a web page relating to the museums of Paris, when the QR information comprised in the code corresponds to a website describing the museums of France and when the GPS location of the terminal T corresponds to Paris.

According to another example, the personalized data can be a web page determined based on a purchase history associated with the anonymous unique identifier CUA and on a QR link towards a merchant site comprised in the captured code (E300).

Particularly, during step G200, the service provision device SRV sends the personalized data Resp to the personalization device P in response to the query ReqM.

Particularly, during a step F700, the personalization device P receives the personalized data Resp and transmits them to the terminal T.

The terminal T receives the personalized service Resp, in particular in the form of personalized data, during a step E500. Thus, the personalization device P allowed the terminal T to access the service offered by the service provision device SRV, in a personalized and anonymous manner without revealing any identifier of the user of the terminal T. By sending the personalized data, the service provision device SRV provides a personalized service for the account identified at the level of the personalization device P by the anonymous unique identifier CUA.

Each time the terminal T sends a query to the personalization device P, it inserts the anonymous unique identifier CUA therein to allow the personalization device P to locate the same account, to personalize the service query transmitted to the service provision device SRV, and to return personalized data for this account to the terminal T.

It is noted that the anonymous unique identifier CUA identifies the account with the personalization device, for the terminal T, and not the user of the terminal T. For this reason, in the mode described with reference to FIG. 2, the anonymous unique identifier CUA is generated (E100) by the terminal T upon reception (E060) of a notification corresponding to successful unlocking by the terminal T of the personalization request device to guarantee the uniqueness of the identifier per user.

For better security, the application PROG1 is executed only upon detection of a notification relating to a successful unlocking of the personalized service request device, for acquiring (E100) the anonymous unique identifier CUA.

In one variant of the first mode described with reference to FIG. 2, when the terminal T acquires (E100) the identifier CUA, it does not transmit it directly to the personalization device P. Step E120 described previously, and a fortiori steps F100a and F200a are not implemented.

According to this second variant, the terminal T sends the anonymous unique identifier CUA to the personalization device P only within the framework of a sending (E400) of a query. It is assumed that the query Req is the first query that the terminal T sends (E400) to the personalization device P, when the personalization device P receives (F300) this first query Req, it extracts therefrom (F100b) the identifier CUA. The personalization device P then acquires, for the first time and during a step F100a, the anonymous unique identifier CUA, and records it in its memory during the step F200b.

Particularly, the personalization method extracts (F100b) from the first query Req (F300) received from the terminal T the initial QR query and the associated anonymous unique identifier CUA.

Particularly, the personalization method uses these two elements extracted from the first query Req (the initial QR query and the anonymous unique identifier CUA) to record (F200b) the initial query or elements based on the initial QR query in a memory of the personalization device in association with the anonymous unique identifier thus making it possible to generate and/or supply traces of the personalized service requests associated with the anonymous unique identifier CUA. In particular, the recording of traces Ig(QR) (F200b) is carried out in a database BD indexed by the anonymous unique identifiers of the users using the service query personalization device P.

Particularly, the query modification modifQR (F500) modifies or enhances the extracted initial QR query (F100b) based on the results of the viewing F400 based on the anonymous unique identifier CUA of the traces previously recorded in the memory of the service query personalization device P, particularly in the indexed database BD.

In one embodiment, the second query ReqM is identical to the first query Req. In particular, the second query ReqM is identical to the first query Req during a first personalized service request by a user since the personalization device does not have any personal data on the user, because it has not yet recorded a service request history.

Particularly, depending on the service request, the user may exceptionally wish to transmit identification data to the service provision device, such as the postal address in the case of purchase of a physical object, the email address in the case of purchase of a content, etc. In these cases, the personalized service request method according to the invention further includes a lifting of the anonymity of a user of the terminal (not illustrated) upon reception of an explicit request from this user.

For example, the terminal verifies whether its user wishes to request a personalized service anonymously or not, in particular based on the type of service requested. If the terminal verifies that the user wishes to disclose one of his identifiers, such as his e-mail address or his telephone number, then the terminal performs a lifting of anonymity, for example by sending an identifier of the user to the personalization device P.

Figure 3:
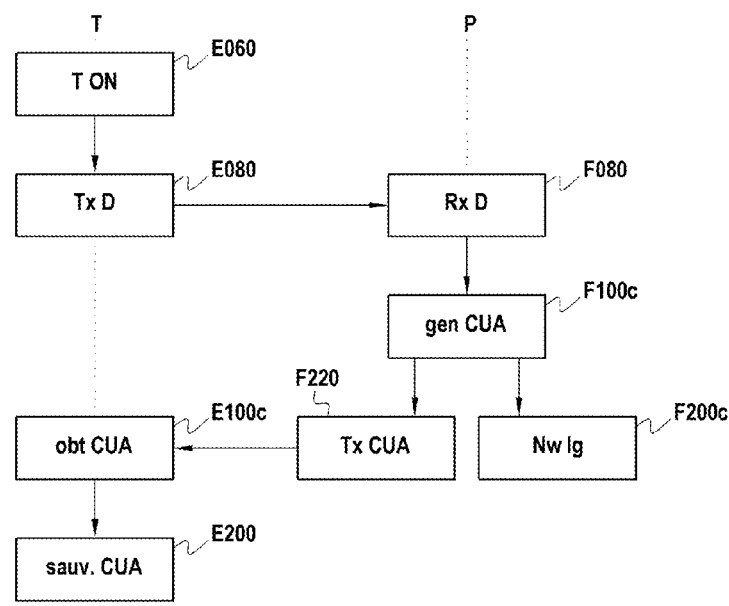
FIG. 3, a flowchart representing steps of a personalized service request method, the method being in accordance with the invention and implemented according to a second embodiment.

FIG. 3 is a flowchart representing steps of the personalized service request method and steps of the service query personalization method according to a second embodiment of the invention, the methods being in accordance with the invention. Particularly, the steps E060, E080, E100c and E200 described below are steps of the personalized service request method according to the invention, implemented by the terminal T. The steps F080, F100c, F200c and F220 described below are steps of the service query personalization method according to the invention, implemented by the personalization device P.

This second mode differs from the first mode described with reference to FIG. 2 in the way of acquiring the unique and anonymous code CUA.

During a step E060, similar to step E060 described with reference to FIG. 2, the terminal T and particularly its application PROG1 acquires information indicating a successful unlocking of the terminal T.

During a step E080, the terminal T sends to the personalization device P a request D for an anonymous unique identifier.

The personalization device P receives the request D during a step F080.

In this second mode, the personalization device P acquires the anonymous unique identifier CUA during a step F100c by generating it, for example by executing a random generation function.

During a step F200c, the personalization device P creates for the anonymous unique identifier CUA in its memory a space for managing the traces of service requests originating from this anonymous unique identifier, in particular by indexing part of a database by means of the generated anonymous unique identifier CUA.

In parallel and during a step F220, the personalization device P sends the anonymous unique identifier CUA to the terminal T in response to its request D.

The terminal T receives the anonymous unique identifier CUA during a step E100c and records it in its memory during a step E200, similar to the step E200 described with reference to FIG. 2.

The methods of the invention, according to this second mode, further include steps identical to steps E280, E300, E400 and E500 of the personalized service request method and to steps F300, F400, F500, F600 and F700 of the service query personalization method, these steps being already described with reference to the FIG. 2.

Figure 4:
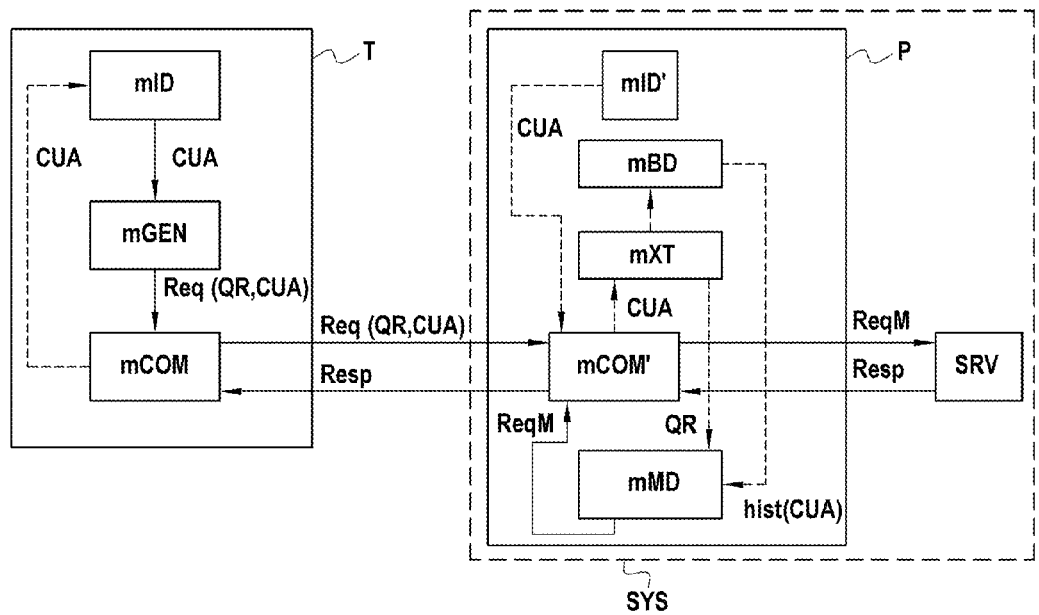
FIG. 4, functional architectures of a terminal in accordance with the invention and of a system comprising a service query personalization device in accordance with the invention.

FIG. 4 represents functional architectures, according to one embodiment of the invention, of the terminal T, of the personalization device P and of the service provision device SRV, the terminal T, the personalization device and the service provision device being in accordance with the invention. Optionally, the personalization device P and the service provision device SRV constitute a personalized service provision system SYS.

The system SYS, comprising the personalization device P and the service provision device SRV, allows providing the terminal T with a service from the service provision device SRV, personalized for an account identified by the service query personalization device P by means of the identifier CUA.

The terminal T is configured to request a personalized service provided by the service provision device SRV. The terminal T includes:
  an identification obtainer (mID) configured to acquire, following an unlocking (E060) of access to a personalized service request device implemented in the terminal (T), an anonymous unique identifier (CUA), adapted to be transmitted, by said terminal (T), in association with a service query, to a service query personalization device (P), the service query being intended for the service provision device (SRV).
Particularly, the terminal T further includes:
  a memory configured to record (E200) the anonymous unique identifier CUA.
Particularly, the terminal further includes:
  a query generator mGEN configured to generate (E300) the first query Req in association with the anonymous unique identifier CUA to access said service.

In particular, the first query Req is made up from an impersonal initial request QR. The initial query is, for example, provided by a code reading device, such as a QR code or NFC code reader, etc.

The code reader is for example implemented in the terminal T or connected to the terminal T. Thus, the terminal T receives from the code reader the initial QR query. The code reader includes for example a sensor, such as a camera, a scanner, etc. or a radio receiver such as an NFC receiver allows either reading or receiving the initial QR query directly in the code or triggering, with the reading of the code, a search for data associated with the code comprising the initial QR query. In particular, the code reader includes a command of search in a database of remote codes for the associated data. Thus, for example, the user photographs or links by means of a camera of the terminal T a QR code or a barcode on an advertising panel or an information panel. Either the reader includes a decoder and/or an extractor for extracting the initial QR query from the code, or the reader uses the (possibly decoded) code to search in a database of remote codes for the data associated with the read code and receive from this remote code base the initial QR query allowing for a quick service request.

Particularly, the terminal T includes:
  a transmitter mCOM configured to send (E400) the first query Req to the personalization device P.

The terminal T does not send any identifier of the user of the terminal T to the personalization device P.

The service query personalization device is in particular placed between a personalized service request device implemented in a communication terminal (T) and a service provision device. It includes:
  a transmitter (mCOM') configured to receive a first service query (Req) associated with an anonymous unique identifier (CUA) originating from the communication terminal (T), said anonymous unique identifier (CUA) having been acquired following an unlocking (E060) of access to said personalized service request device, the first service query (Req) allowing the service query personalization device (P) to generate a second query (ReqM) from said first service query (Req), said second query (ReqM) being personalized based on data previously recorded by the service query personalization device in association with said anonymous unique identifier (CUA).

The personalization device P allows a personalization of at least one service, comprising the service provided by the service provision device SRV.

Particularly, the personalization device P includes:
  an obtainer mID' (F100a, F100b, F100c) of the anonymous unique identifier CUA of an account with the personalization device, this identifier not identifying a user of a terminal;
Particularly, the personalization device P includes:
  a memory configured to record (F200a, F200b, F200c) traces of service requests in association with the anonymous unique identifier CUA;
Particularly, the personalization device P includes:
  a transmitter mCOM' configured to receive the first query Req comprising the anonymous unique identifier CUA; this transmitter being configured to send to the service provision device SRV the second query ReqM, this second query ReqM being acquired from the first query Req of prior service requests associated with the anonymous unique identifier CUA.
Particularly, the personalization device P includes:
  an extractor configured to extract from the first query Req, the initial QR query and the associated anonymous unique identifier CUA.
Particularly, the personalization device P includes:
  an access manager mBD, configured to record, in a field of the database BD indexed by said unique identifiers, information relating to said service requests (traces of the service requests).
Particularly, the personalization device P includes:
  an access manager mBD, configured to view, in particular in a field of the database BD indexed by said unique identifiers, information relating to said service requests (traces of the service requests) associated with the anonymous unique identifier received in the first query Req.

The service provision device SRV provides (G200) a personalized service for the account based on the identifier CUA.

Figure 5:
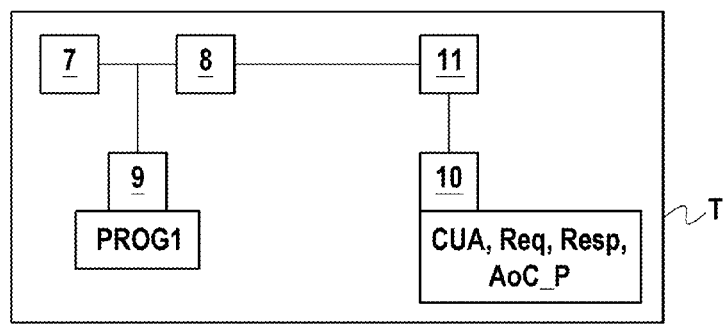
FIG. 5, a hardware architecture of a terminal according to one embodiment of the invention.

In the embodiment described here, the terminal T has the hardware architecture of a computer, as illustrated in FIG. 5.

The architecture of the terminal T comprises in particular a processor 7, a random access memory 8, a read only memory 9, a non-volatile flash memory 10 in a particular embodiment of the invention, as well as communication means 11. Such means are known per se and are not described in more detail here.

The read only memory 9 of the terminal T according to the invention constitutes a recording medium in accordance with the invention, readable by the processor 7 and on which a computer program PROG1 in accordance with the invention is recorded here.

The memory 10 of the terminal T allows recording variables used for the execution of the steps of the personalized service request method according to the invention, such as the anonymous unique identifier CUA, the query Req, the personalized data Resp and a contact address AoC_P of the personalization device P.

The computer program PROG1 defines functional and software modules here, configured to anonymously access a service. These functional modules rely on and/or control the hardware elements 7-11 of the terminal T mentioned above.

The terminal T can also implement the method for accessing a service in accordance with the invention, when it is configured to lift the anonymity upon reception of an explicit request from the user of the terminal T.

In this case, the read only memory 9 of the terminal T according to the invention constitutes a recording medium in accordance with the invention, readable by the processor 7 and on which a computer program PROG1 in accordance with the invention is recorded. The computer program PROG1 defines functional and software modules here, configured to access a service. These functional modules rely on and/or control the hardware elements 7-11 of the terminal T mentioned above.

Figure 6:
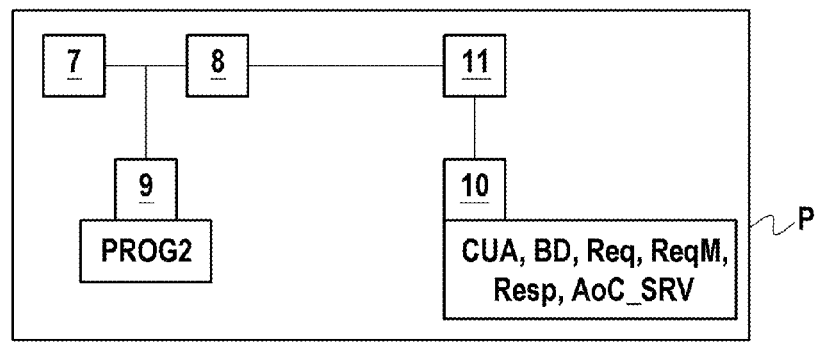
FIG. 6, a hardware architecture of a service query personalization device according to one embodiment of the invention.

In the embodiment described here, the personalization device P has the hardware architecture of a computer, as illustrated in FIG. 6.

The architecture of the personalization device P comprises in particular a processor 7, a random access memory 8, a read only memory 9, a non-volatile flash memory 10 in a particular embodiment of the invention, as well as communication means 11. Such means are known per se and are not described in more detail here.

The read only memory 9 of the personalization device P according to the invention constitutes a recording medium in accordance with the invention, readable by the processor 7 and on which a computer program PROG2 in accordance with the invention is recorded here.

The memory 10 of the personalization device P allows recording variables used for the execution of the steps of the method allowing a personalized service request for at least one service, according to the invention, such as the anonymous unique identifier CUA, the query Req, the personalized data Resp, the database BD or an address to access this database, and a contact address AoC_SRV of the service provision device SRV.

The computer program PROG2 defines functional and software modules here, configured to allow anonymous access to at least one service. These functional modules rely on and/or control the hardware elements 7-11 of the personalization device P mentioned above.

The invention claimed is:

1. A method for requesting personalized service by a communication terminal, the method comprising, following an unlocking of access to a personalized service request device, the device being implemented in the communication terminal:
   acquisition of an anonymous unique identifier, adapted to be transmitted, by the terminal, in association with a service query, to a service query personalization device, the service query being intended for a service provision device;
   sending, to the service query personalization device, the service query associated with the anonymous unique identifier, the service query being intended for the service provision device; and
   after sending of the service query, receiving a personalized response originating from the service provision device, the personalized response resulting from a processing implemented by the service provision device based on a modified query received from the service query personalization device, the modified query having been generated by the service query personalization device based on:
   the service query sent; and
   the anonymous unique identifier associated with the service query.

2. The method of claim 1, wherein the acquisition of the identifier comprises one of the following steps:
   generating the anonymous unique identifier, or
   receiving the anonymous unique identifier from an anonymous unique identifier generator implemented in an equipment of a communication network separate from the service provision device.

3. The method of claim 1, further comprising capturing data relating to the service, the data capture triggering the sending of the service query.

4. The method of claim 3, wherein the data are acquired from a code of a QR code type or of an NFC tag type.

5. The method of claim 1 further comprising sending, to the service provision device, location information of the terminal.

6. A non-transitory computer readable medium having stored thereon instructions which, when executed by a processor, cause the processor to implement the method of claim 1.

7. A method for personalizing service queries by a service query personalization device, the method comprising:
   receiving a first service query associated with an anonymous unique identifier originating from a communication terminal, the anonymous unique identifier having been acquired following an unlocking of access to a personalized service request device implemented in the communication terminal, the first service query allowing the service query personalization device to generate a second query from the first service query, the second query being personalized based on data previously recorded by the service query personalization device in association with the anonymous unique identifier.

8. The method of claim 7, further comprising sending the second query to the service provision device.

9. The method of claim 7, further comprising recording in a database information relating to the first service query indexed by the anonymous unique identifier.

10. The method of claim 9, further comprising viewing the database, the second query being acquired by modification of the first service query based on a result of the viewing.

11. A non-transitory computer readable medium having stored thereon instructions which, when executed by a processor, cause the processor to implement the method of claim 7.

12. A communication terminal configured to request a personalized service and comprising:
   an identification obtainer configured to acquire, following an unlocking of access to a personalized service request device implemented in the terminal], an anonymous unique identifier, adapted to be transmitted, by the terminal, in association with a service query, to a service query personalization device, the service query being intended for a service provision device;

a transmitter configured to send, to the service query personalization device, a service query associated with the anonymous unique identifier, the service query being intended for the service provision device; and a receiver configured to receive, after sending of the service query, a personalized response originating from the service provision device, the personalized response resulting from a processing implemented by the service provision device based on a modified query received from the service query personalization device, the modified query having been generated by the service query personalization device based on:

the service query sent; and the anonymous unique identifier associated with the service query.

13. A service query personalization device comprising:

a transmitter configured to receive a first service query associated with an anonymous unique identifier originating from a communication terminal, the anonymous unique identifier having been acquired following an unlocking of access to a personalized service request device implemented in the communication terminal, the first service query allowing the service query personalization device to generate a second query from the first service query, the second query being personalized based on data previously recorded by the service query personalization device in association with the anonymous unique identifier.

* * * * *